United States Patent [19]
Lemelson

[11] Patent Number: 5,966,457
[45] Date of Patent: *Oct. 12, 1999

[54] METHOD FOR INSPECTING, CODING AND SORTING OBJECTS

[76] Inventor: Jerome H. Lemelson, Suite 286, Unit 802, 930 Tahoe Bvd., Nev. 89451-9436

[*] Notice: This patent issued on a continued prosecution application filed under 37 CFR 1.53(d), and is subject to the twenty year patent term provisions of 35 U.S.C. 154(a)(2).

[21] Appl. No.: 07/848,220

[22] Filed: Mar. 10, 1992

Related U.S. Application Data

[63] Continuation of application No. 07/829,911, Jan. 31, 1992, which is a continuation of application No. 07/555,932, Jul. 20, 1990, abandoned, which is a continuation-in-part of application No. 07/065,379, Jun. 23, 1987, Pat. No. 4,965, 829, which is a continuation-in-part of application No. 06/686,908, Dec. 27, 1984, Pat. No. 4,675,498, which is a continuation of application No. 05/968,216, Dec. 11, 1978, abandoned, which is a continuation of application No. 05/667,255, Mar. 16, 1976, abandoned, which is a continuation of application No. 05/506,887, Sep. 17, 1974, abandoned, which is a continuation-in-part of application No. 05/157,574, Jun. 28, 1971, abandoned, which is a continuation-in-part of application No. 04/665,526, Sep. 5, 1967, Pat. No. 3,587,856, which is a continuation-in-part of application No. 04/215,210, Aug. 6, 1962, abandoned, which is a continuation of application No. 04/142,748, Aug. 28, 1961, Pat. No. 3,646,258, which is a division of application No. 03/515,147, Jun. 14, 1955, Pat. No. 3,003,109, said application No. 05/506,887, is a continuation-in-part of application No. 05/498,953, Aug. 20, 1974, abandoned, which is a continuation-in-part of application No. 05/157,573, Jun. 28, 1971, abandoned, which is a continuation-in-part of application No. 04/665,526, Sep. 5, 1967, Pat. No. 3,587,856, said application No. 05/968,216, Dec. 11, 1978, is a continuation of application No. 04/225,173, Aug. 27, 1962, Pat. No. 4,213,163, which is a continuation-in-part of application No. 03/668,348, Jun. 27, 1957, Pat. No. 3,051,777, which is a continuation-in-part of application No. 03/515,147, and a continuation-in-part of application No. 03/544,991, Nov. 4, 1955, Pat. No. 2,959,636.

[51] Int. Cl.[6] .................................................. G06K 9/00
[52] U.S. Cl. .......................................................... 382/141
[58] Field of Search .............................. 382/61, 100, 141; 219/121.62, 121.69, 121.71, 121.72, 121.8, 121.81; 358/101, 105, 107, 296; 356/380, 386; 209/3.1–3.3, 569, 584, 546; 346/74, 75, 76 L; 360/9.1, 72.1

[56] References Cited

U.S. PATENT DOCUMENTS

| | | | |
|---|---|---|---|
| 1,985,035 | 12/1934 | Kermode et al. | 209/111 |
| 3,152,858 | 10/1964 | Wadey | 346/75 |
| 3,179,042 | 4/1965 | Naiman | 346/75 X |
| 3,309,711 | 3/1967 | Sorrells | 209/3.3 X |
| 3,325,819 | 6/1967 | Fraser | 346/76 L |
| 3,521,294 | 7/1970 | Treves | 360/59 |
| 3,587,856 | 6/1971 | Lemelson | 209/3.3 |

(List continued on next page.)

OTHER PUBLICATIONS

Levy, "The Electronic Aspects of the Canadian Sorting of Mail System," *Proc. of the National Electronics Conference*, pp. 543–556 (date asserted to be Oct. 1954).

Carroll, "Trends in Computer Input/Output Devices," *Electronics*, pp. 142–149 (Sep. 1956).

(List continued on next page.)

*Primary Examiner*—Jose L. Couso
*Attorney, Agent, or Firm*—Louis J. Hoffman; Steven G. Lisa

[57] ABSTRACT

An apparatus and method for printing selected indicia on objects, including, for example, sheets, cards, envelopes and containers. The objects are conveyed, one at a time, by a conventional conveying device along a path past a printing station. An electrically operated detector, such as a limit switch or photoelectric detector, senses a portion of each article, such as its leading edge, and generates a control signal. The control signal triggers activation of a memory containing a train of signals, which are applied to control a printer that automatically applies ink to print a selected group or line of indicia, such as alpha-numeric characters or codes, along a portion of the surface of each object.

53 Claims, 3 Drawing Sheets

U.S. PATENT DOCUMENTS

| | | | |
|---|---|---|---|
| 3,633,720 | 1/1972 | Tyler | 346/74.3 |
| 3,703,628 | 11/1972 | Philipson | 346/75 X |
| 3,892,174 | 7/1975 | Marcher | 101/35 |
| 4,342,038 | 7/1982 | Lemelson | 346/75 |
| 4,653,109 | 3/1987 | Lemelson | 382/34 |
| 4,675,498 | 6/1987 | Lemelson | 219/121 LB |
| 4,965,829 | 10/1990 | Lemelson | 382/1 |
| 4,969,038 | 11/1990 | Lemelson | 382/34 |
| 5,053,611 | 10/1991 | Takahashi et al. | 235/454 |

OTHER PUBLICATIONS

Eldredge et al., "Automatic Input for Business Data–Processing Systems," *Proceedings of the Eastern Joint Computer Conference,* pp. 69–73 (date asserted to be Dec. 1956).

Young, "Automatic Character Recognition," *Electronic Engineering,* pp. 2–10 (Jan. 1960).

Gronich et al., "Machines That Read," *Radio–Electronics,* pp. 64–67 (Sep. 1960).

Bauldreay et al., "Solving Registration Problems In Optical Character Recognition," *Electronics,* pp. 77–81 (Jan. 5, 1962).

Butterfield et al., "Two Ideas for Character Recognition," *Control Engineering,* p. 113 (Aug. 1962).

*Optical Character Recognition* (Symposium on Optical Character Recognition 1962, Fischer et al., eds.).

Spinrad, "Machine Recognition of Hand Printing," *Information and Control,* pp. 124–142 (vol. 8, 1965).

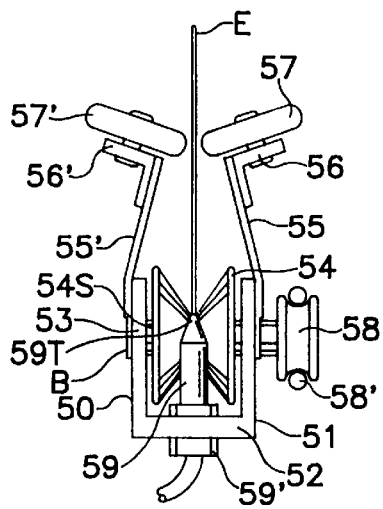
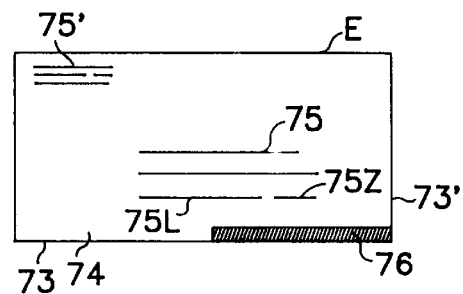
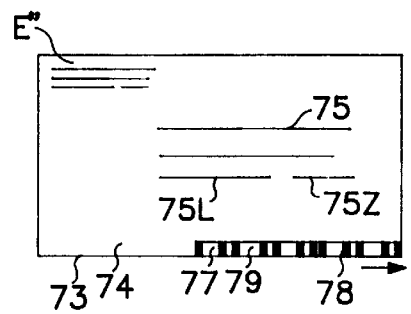
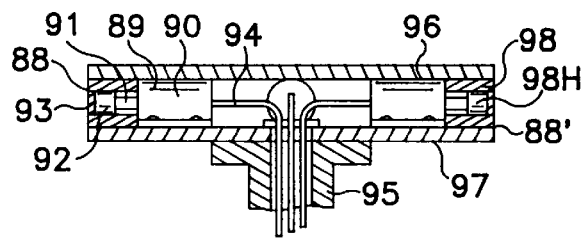
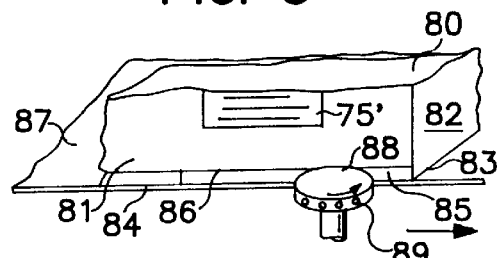
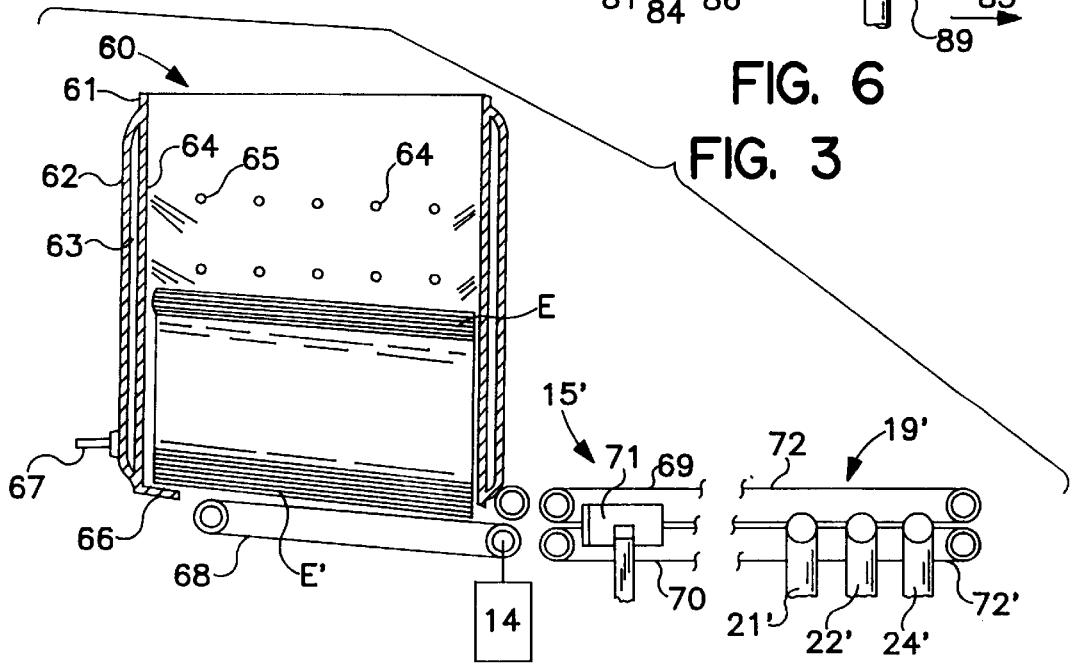

METHOD FOR INSPECTING, CODING AND SORTING OBJECTS

This is a continuation of application Ser. No. 829,911, filed Jan. 31, 1992, which is a continuation of application Ser. No. 555,932, filed Jul. 20, 1990, now abandoned, which is a continuation-in-part of Ser. No. 065,379, filed Jun. 23, 1987, now U.S. Pat. No. 4,965,829, which is a continuation-in-part of Ser. No. 686,908, filed Dec. 27, 1984, now U.S. Pat. No. 4,675,498, which is a continuation of Ser. No. 968,216, filed Dec. 11, 1978, now abandoned, which is a continuation of Ser. No. 667,255, filed Mar. 16, 1976, now abandoned, which is a continuation of Ser. No. 506,887, filed Sep. 17, 1974, now abandoned, which is a continuation-in-part of Ser. No. 157,574, filed Jun. 28, 1971, now abandoned, which is a continuation-in-part of Ser. No. 665,526, filed Sep. 5, 1967, now U.S. Pat. No. 3,587,856, which is a continuation-in-part of Ser. No. 215,210, filed Aug. 6, 1962, now abandoned, which is a continuation of Ser. No. 142,748, filed Aug. 28, 1961, now U.S. Pat. No. 3,646,258, which is a division of Ser. No. 515,147, filed Jun. 14, 1955, now U.S. Pat. No. 3,003,109. Application Ser. No. 506,887 was also identified as a continuation-in-part of Ser. No. 498,953, filed Aug. 20, 1974, now abandoned, which is a continuation-in-part of Ser. No. 157,573, filed Jun. 28, 1971, now abandoned, which is in turn a continuation-in-pat of Ser. No. 665,526, identified above. Application Ser. No. 225,173, filed Aug. 27, 1962, now U.S. Pat. No. 4,213,163, which is a continuation-in-part of Ser. No. 668,348, filed Jun. 27, 1957, now U.S. Pat. No. 3,051,777, which in turn is a continuation-in-part of Ser. No. 515,147, identified above, and a continuation-in-part of Ser. No. 544,991, filed Nov. 4, 1995, now U.S. Pat. No. 2,959.636.

SUMMARY OF THE INVENTION

This invention relates to an apparatus and method for both coding and reading codes on objects such as cards, sheets, envelopes, containers and otherwise shaped articles of manufacture for the purposes of routing and conveying same, identifying such articles and recording and reproducing information. Radiation beam generating and control means, such as disclosed in my U.S. Pat. No. 4,213,163, is employed for recording codes on objects, and in certain instances, for reading such codes.

Various means are known in the art for scanning and sorting cards and mail pieces in order to identify and route same to destinations and to selectively reproduce information recorded thereon. Various shortcomings are present in such prior art systems which employ electro-optically scannable recordings printed on objects and detected by photoelectric cells as the objects move past detection stations at which such photoelectric cells are located. Means for identifying objects, with or without special codes recorded thereon, have been rather complex and costly. Conventional electro-optical character reading equipment, for example, which is operable to read printed alpha-numeric characters, requires that such characters either be predeterminately located on the objects or that complex character reading means be provided which is expensive to manufacture and operate, due to the required use of sophisticated electrical logic circuitry.

Accordingly it is a primary object of this invention to provide a new and improved scanning system and method of simple construction and operation for use in scanning objects, record members and the like.

With the above and such other objects may hereinafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

IN THE DRAWINGS

FIG. 2 is an end view of one type of conveyor for oblong flat articles of the type conveyed in FIG. 1;

FIG. 3 is a side view with parts broken away for clarity of a modified form of the feed and conveying means of FIG. 1;

FIG. 4 is a side view of one form of piece conveyed by the apparatus of FIGS. 1–3;

FIG. 5 is a side view of another form of piece conveyed by the apparatus of FIGS. 1–3; and FIG. 6 is a fragmentary view of another form of piece which may be coded and conveyed by apparatus of the type described.

FIG. 7 is a side view with parts broken away for clarity of a portion of a wheel-device operative for recording series codes along a band area of a card, envelope, box, tape or other article.

Figure 1:
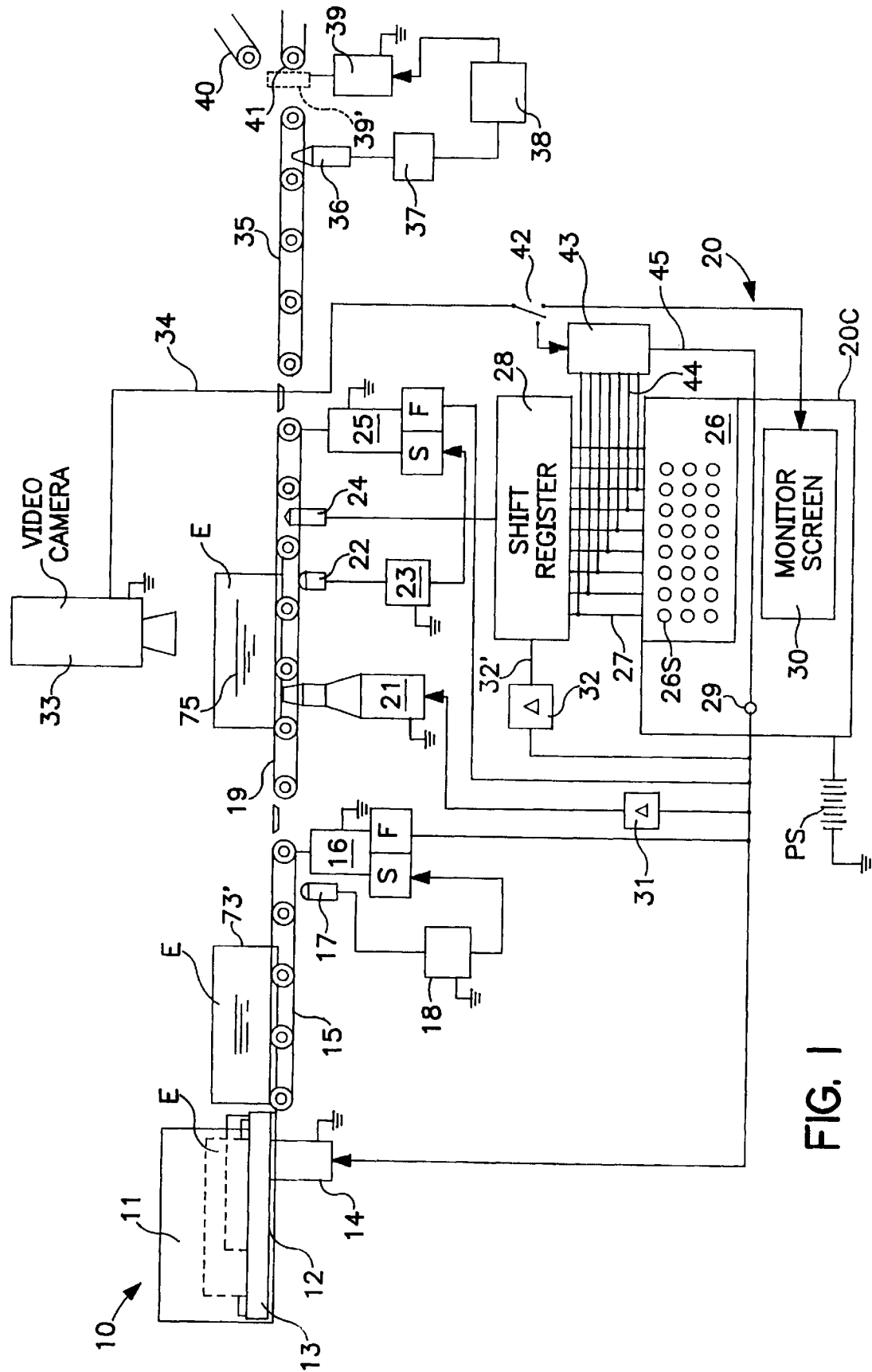
FIG. 1 is a schematic diagram illustrating an article coding, reading and routing system which is particularly applicable to the routing of mail pieces and information bearing cards.

In FIG. 1 is shown part of a system for automatically coding and routing articles such as envelope and card mail pieces. However, the system illustrated in FIG. 1 is also applicable to the coding and routing of packages by utilizing most of the scanning, coding and conveying techniques provided therein.

The coding and sorting or routing system 10 includes a first means 11 such as a feeding bin or other suitable storage means for a plurality of mail pieces or cards which are individually designated by the alphabetical character E. The pieces E to be coded and routed may be horizontally or vertically stacked within the bin or feed magazine 11 in accordance with known designs, one such magazine illustrated in U.S. Pat. No. 2,891,467 contains means for feeding individual mail pieces to an outflow conveyor. In FIG. 1, the mail pieces E are fed in a horizontal stack and the endmost piece is disposed against a power-driven conveyor belt 13 which, cooperates with a feed mechanism 12 which is driven, together with the belt 13, by a controlled electric motor 14 which operates to feed individual mail pieces or cards intermittently onto a conveyor 15 leasing to a conveyor 19 at the coding station 20. Conveyor 15, intermittently driven by a controlled electric motor 16, which like motor 14, is preferably a gear motor and has respective start and stop controls designated F and S which may comprise the inputs to a pulse operated bistable switch feeding electrical energy to the input of said motor. Motor 14 may be similarly operated, although in FIG. 1, it is illustrated as having a single control line input thereto for pulsing the motor control and comprising part of the unit 14, and such control is operative when so energized to cause the motor and the mechanism driven thereby to operate in a single cycle for releasing just one card or mail piece E from bin 11 to the conveyor 15 as provided, for example, in the Recordak 300 Stack-Reader for feeding cards to a reader.

The conveyor 15 is operative, as illustrated in greater detail in FIG. 2, to convey the lower edge 73 of a card or envelope along a predetermined path or line so that said lower edge will be properly disposed for applying a code recording or marking therealong such as on the border area adjacent said lower edge as will be hereafter described. Thus, regardless of the height and length of the envelope, all envelopes will contain a code sorting or destination recording along their lower edges or borders which may be easily read for sorting purposes by predeterminately positioning and conveying each piece with the lower edge thereof travelling the same path as the lower edges of all such pieces.

A photoelectric detector 17 is disposed immediately adjacent conveyor 15 and is operative to detect the leading edge 73 of a piece E travelling along conveyor 15. The photoelectric controller 16 for the cell or scanning system 17 is operative to generate an output pulse upon detecting such leading edge, which pulse is applied to the stop control S of motor 16 which temporarily stops conveyor 15 carrying the piece to be coded thereon while awaiting release of the piece downstream thereof which is being scanned and coded.

Coding and monitor station 20 includes a viewing screen 30 which provides an enlarged image of the address 75 on the face of the card or envelope E when the latter is disposed in the scanning field of a television camera 33 having its picture signal output 34 connected to the video receiver containing the monitor screen 30. Thus the operator of the station may easily view the state and city destination printed on written as part of the address 75 of the card, permitting him to properly code the lower edge of the card.

The monitor station 20 includes a console 20C having, in addition to the monitor screen 30, a single pushbutton cycle control switch 29 and a panel 26 containing a plurality of pushbutton coding switches 26S. By properly depressing the banks of coding switches 26S, parallel destination codes are generated on the outputs 27 thereof which extend to a shift register 28 for converting the parallel codes to a series code which is held therein until an input 32' to the shift register is energized, after which the series code is applied to activate a recording device 24 which records the series code along the lower border or edge of the piece E.

Upon activating a cycle control switch 29, a control signal is generated on a plurality of circuits including a circuit extending to the control for the motor-operated device 14 for releasing the next piece from the bin 11, the start control F of motor 16 for driving the piece held upon conveyor 15 to conveyor 19, the start control F of motor 25 for driving conveyor 19 to remove the previously coded piece therefrom onto continuously driven conveyor 35 and a delay relay 32 in the line 34' leading to the trigger input of the shift register 28. A delay in the operation of the shift register is thus provided to permit the leasing edge of the piece E to be coded to be driven past the recording transducer 24. After recording is effected, the piece is transferred from conveyor 19 to conveyor 35 which extends to a plurality of branch conveyors, designated 40, 41, etc., onto one of which the piece is conveyed or transferred by means to be described.

Edge or border coding of each piece on the conveyor 19 may be effected in one of a number of manners depending upon the marking or recording system provided. In FIG. 1, an automatic, motor-operated applicator 21 for recording material has its output closely disposed to the path along which each piece is conveyed on conveyor 19 and is operated by a signal generated by a time delay relay 31, which is activated when the cycle start control switch 29 is activated. In other words, at some time after the piece E has started its movement towards conveyor 19 from conveyor 15, the applicator device 21 dispenses a recording material by spraying or rolling same along the lower edge or border of the mail piece as it passes said applicator. In one form of the invention, the recording material may comprise magnetic oxide which is roller or spray coated along said edge or border or is otherwise applied thereto as the piece is fed past the applicator on conveyor 19.

A photoelectric detector 22 detects the leading edge of the piece E and its control 23 generates a pulse output to the stop control S of motor 25 which predeterminately positions the piece in the scanning field of the video camera 33. The operator of the station 20 reads the address 75 on the face of the piece E and, either mentally, or by reference to a chart, generates the necessary address or selection code by properly operating selected of the switches 26S of the control panel 26. Thereafter, the cycle is repeated when the operator depresses start cycle control switch 29 after which the recording transducer 24, which may comprise a magnetic recording head, is engaged or rolled against the edge or border of the piece E containing the recording material provided by device 21. The motor 25 is operated to remove the piece E from conveyor 19 to transfer it to conveyor 35 until the photoelectric detector 22 detects the leading edge of the next card whereupon motor 25 is stopped by pulsing the stop input S thereof.

The piece E may be stored downstream of conveyor 19 in the event that it is a card to be edge coded or, if it is a mail piece it may be conveyed on conveyor 35 past a magnetic reproduction transducer 36 which is operative to operably engage the magnetic recording material applied to the lower edge or border thereof and to reproduce the code provided as a recorded pulse train along such lower portion of the piece. The output of reproduction transducer 36 is passed to an amplifier 37 which generates a series code on its output, which output extends to a logical switching circuit controller 38 which controls a servo 39 operating gate deflection means 39' for properly transferring the piece to one of a plurality of branch conveyors 40, 41, etc. for properly routing the piece E along that path which is indicated by the code provided along its lower edge and reproduced by reproduction transducer 36.

In FIG. 1, notation PS refers to a power supply for electrically powering the switches, controls and motor device 30 associated with the monitor and coding switch controller 20C for generating the described control and code signals on the outputs there. It is assumed that suitable power supplies are provided on the proper sides of all switches, controls and motors illustrated in FIG. 1, such not having been illustrated therein for the purpose of simplifying the drawings.

The recording material device 21 may be subject to a number of variations depending on the coding, recording and scanning apparatus used in the system. For example, device 21 may adhesively apply coded or uncoded tape, such as magnetic recording tape, along a selected band area such as near or parallel to the lower edge of member E. Printed or other optically scannable tapes or recording material may be applied by suitable roller applying means comprising part of device 21 which may also contain recording means for the code operatively connected to the code generating means described herein. Device 21 may also comprise a printing wheel for magnetic material or ink for applying machine readable characters or codes along the piece E as it is driven therepast. Device 21 or the transducer 22 may also comprise a laser and means for pulse modulating its output with code signals for burning a code along or parallel to the lower edge of members E or contains fed therepast.

It is also noted that reading device 36 may be a photoelectric reading system such as employing a light reflected off an electro-optically readable code applied by one of the means defined herein.

The automatic scanning means for identifying the document, envelope or package and/or determining its destination, so as to provide a coded electrical signal for controlling recording as described, may comprise a conventional electro-optical character reader adapted to read all lines of the address or label 75 and, by logical circuit or other means, determines the destination and/or other characteristics of the document for coding purposes. In a preferred form, means may be provided for the reader to read just the last line of characters and preferably the last portion 752 thereof which may comprise the zip code. Suitable optical scanning means may be provided, such as an electron beam scanning means to scan laterally from or near the bottom edge of the envelope upwardly until the last line of characters is identified and is operable to generate a pulse output upon detecting such last lien to control the positioning of the line scanning means so as to only scan said last line. If the envelope is fed lateral to its longitudinal edge 73 such edge by means provided in my U.S. Pat. No. 3,309,669, then the activation of any one of a plurality of photoelectric detectors, scanning the face of the envelope and disposed in a line parallel to edge 73, may generate a control signal when the last line 752 of characters is scanned and such control signal may be employed to stop the means driving the envelope and initiate the operator of the scanning disc or beam to cause it to scan such last line, which may comprise characters defining the town and city or may be the mail zip code per se. If such last line is defined by the zip code, the code signals output by the scanner may define a series of binary codes indicative of the zip code which may be recorded, as described, along the recording area of the envelope or may be electronically converted to a single binary series code indicative of the zip code number prior to applying same to modulate the recording transducer. A suitable time delay relay may be employed to initiate the motor driving the envelope from the reader onto, for example, a conveyor of the type described such as edge travelling conveyor 35.

If an electron beam scanning means is operable to read the zip code 752, suitable logical switching circuitry may be provided to detect the last line or zip code portion of the address 75 and cause the read beam of the scanning means to read such last lien or zip code or control a gate to pass the modulated analog signal output generated when the read beam thereof scans said last line of characters or code, to a suitable means for converting such analog signal to a suitable signal form which may be used to modulate and control the described magnetic or optical recording means. If the zip code comprises the last line of printed matter, it may be read per se and the resulting signals may be applied to the recording transducer. If such zip code is not part of the last line of the address being read, beam scanning may be effected which initiates at the end of the line containing such code until the gap is detected between the zip code and end of the printing defining the address portion of the last line which scanning may be used to generate signals defining such zip code number.

Thus it is seen that the apparatus defined in FIG. 1 may be operated either by a person viewing individual mail pieces when said mail pieces contain a variety of addresses in printed or handwritten form and disposed at various locations or may be automatically effected if the mail pieces and their printed addresses are uniform and capable of being electro-optically scanned. Switch 42 in the output line 34, may be manually operated to define either automatic or manual operation of the scanning and coding operation.

The automatic scanning system defined by scanner 33 and computing circuitry 43 may be operated in accordance with known address scanning and recognition equipment or that provided in application Ser. No. 622,650 which provides a rotating disc for reading a select line of a document driven past the scanner or by moving the scanner past the document.

FIG. 2 illustrates a conveyor for edgewise conveying thin oblong members E, such as cards and envelopes, to be coded. The features shown in FIG. 2 may be applied to any or all of the conveyors 15, 19 and 35 of FIG. 1. The oblong card or mail piece E is disposed in a channel-like guideway defined by longitudinally aligned conveyor wheels 54 having outer surfaces which taper sharply inwardly, as illustrated, to provide V-shaped wells for the cards or envelopes resting on the upper surfaces thereof. A plurality of longitudinally aligned wheels 54 are rotationally supported in spaced-apart relationship by a channel-like member 50, the side walls 51 and 53 of which contain ball bearings B which rotationally support the shafts 54S of the wheels 54.

The single concave, wedge shaped roller 54 of FIG. 2 may also be replaced or supplemented by a plurality of cylindrical rollers disposed with their peripheral surfaces properly angled to the horizontal with alternate rollers of an array of said rollers angled and power rotated to provide the same lower edge aligning, guiding and driving effect as the single rollers 54 illustrated in FIG. 2.

Other conveying means may also be provided to predeterminately align and guide the lower longitudinal edges of each envelope or card along a predetermined path for coding and reading same as described. For example, the horizontally angled surfaces defined by the inwardly tapering conical portions of the rollers 54 of FIG. 2, may be replaced by a pair of power driven flexible belts each angled upwardly and driven in the same direction at the same speed with their lower edges disposed close to each other or they may be shaped wherein the lower edge of one abuts the upper surface of the other so as to provide a guideway for the lower edge of each mailpiece. A single belt or pulley of resilient material, folded or having a V-shaped upper surface may also be utilized.

In the embodiment of FIG. 2, it is noted that said wheel shaft 54 extends outwardly through the bearings from the wall 51 and contains pulleys 58 on the ends thereof which are rotated by a chain or belt 58' driven by a pulley or sprocket on the shaft of motor 16 so that all wheels 54 rotate simultaneously to drive the piece E therealong.

Cantileverly supported on the sidewalls 51 and 53 of the channel 50 and extending upwardly therefrom are a plurality of pairs of leaf spring members designated 55 and 55', each of which supports a pillow block denoted 56 and 56', which rotationally support respective wheels 57 and 57', the peripheries of which are spaced apart a degree greater than the thickness of the average piece E, although possibly less than thickness of the heaviest gauge or thickest mail piece. Thus, while some degree of lateral movement of the mail piece E may be effected between the rollers 57 and 57' such mail piece will be guided thereby and, if such wheels are power rotated by means such as that rotating the wheels 54, further means will be provided for power driving the member E along its guided path.

Since the lower edge of all pieces E is determined by the path defined by the low point of the radian groove or recess formed in the wheels 5, various devices such as the described magnetic recording and reproduction transducers, recording material application means and edge detection means may be provided between adjacent wheels 54 as illustrated in FIG. 2 wherein a recording device 59 is supported by the bottom wall 52 of the channel 50 and is removably secured thereto by means of adjusting nuts 59' which retain same in a hole extending vertically through the bottom wall 52. If the exterior wall of member 59 is threaded, the transducer 59T which is secured thereby may be vertically adjusted and held by adjusting and tightening such adjustment nuts 59' against the wall 52 of the channel. The transducer head 59T illustrated in FIG. 2 is 71 as it is driven onto the conveyor 15' so as to align the edges of all pieces thereagainst to permit coding to be effected as described. From conveyor 15' the pieces are fed to a conveyor 19' corresponding to conveyor 19 of FIG. 1 and comprising a pair of power-driven endless belts 72 and 72' between which edge mail piece E is driven. Disposed adjacent the edges of belts 72 and 72' are devices 21', 22' and 24' corresponding in function to the recording material applicator 21, the photoelectric detector 22 and the recording transducer 24 of FIG. 1, each of which is so mounted to align its output with the edge or border of the card driven therepast as the conveyor 19' operates. The conveyors 68, 15' and 19' intermittently and sequentially operated as described in the description of the apparatus of FIG. 1.

In FIG. 3, notation 65 refers to holes provided in the sidewalls of bin 61 operable for laterally exhausting air downwardly through the interior of bin 61 against the stack of mail pieces or cards through the holes 64.

FIGS. 4 and 5 illustrate mail piece or card structures employing different types of recordings along the edge or border portion thereof. In FIG. 4, the piece E is illustrated as an envelope or card having multiple address lines 75 containing written or printed name and destination characters, and return address lines 75' disposed near the upper left hand corner thereof. Disposed adjacent to the lower edge 73 of the piece E along the margin or border portion 74 thereof, is a strip, tape or coating of magnetic recording material which may be applied thereto when the card or envelope is first fabricated, when it is addressed or by the means provided in FIG. 1 which may comprise a spray nozzle, roller coating wheel or applicator for a short length of magnetic tape; the magnetic recording material being generally defined by the notation 76 and illustrated as extending from the leading edge 73' of the piece E a sufficient distance along the lower marginal border 74 71 as it is driven onto the conveyor 15' so as to align the edges of all pieces thereagainst to permit coding to be effected as described. From conveyor 15' the pieces are fed to a conveyor 19' corresponding to conveyor 19 of FIG. 1 and comprising a pair of power-driven endless belts 72 and 72' between which edge mail piece E is driven. Disposed adjacent the edges of belts 72 and 72' are devices 21', 22' and 24' corresponding in function to the recording material applicator 21, the photoelectric detector 22 and the recording transducer 24 of FIG. 1, each of which is so mounted to align its output with the edge or border of the card driven therepast as the conveyor 19' operates. The conveyors 68, 15' and 19' are intermittently and sequentially operated as described in the description of the apparatus of FIG. 1.

In FIG. 3, notation 65 refers to holes provided in the sidewalls of bins 61 operable for laterally exhausting air downwardly through the interior of bin 61 against the stack of mail pieces or cards through the holes 64.

FIGS. 4 and 5 illustrate mail piece or card structures employing different types of recordings along the edge or border portion thereof. In FIG. 4, the piece E is illustrated as an envelope or card having multiple address lines 75 containing written or printed name and destination characters, and return address lines 75' disposed near the upper left hand corner thereof. Disposed adjacent to the lower edge 73 of the piece E along the margin or border portion 74 thereof, is a strip, tape or coating of magnetic recording material which may be applied thereto when the card or envelope is first fabricated, when it is addressed or by the means provided in FIG. 1 which may comprise a spray nozzle, roller coating wheel or applicator for a shirt length of magnetic tape; the magnetic recording material being generally defined by the notation 76 and illustrated as extending from the leading edge 73' of the piece E a sufficient distance along the lower marginal border 74 to permit the longest serial code to be recorded thereon.

In FIG. 5 is shown an elongated record member 75, such as an envelope or card containing address lines 75 of characters on one face thereof and a code 77 in the form of a plurality of spaced-apart, optically scannable marks 78 of predetermined height and separated by spaces 79 which, when scanned, also define a portion of the printed code. The marks 78 printed along the border portion 74 of the piece E' of FIG. 5, may be provided along the lower margin and/or across the lower edge 73 thereof by one or more selective recording means including a selectively operable array of rotary mark printing devices, such as selectively projectable and retractable printing cuts disposed at the ends of the spokes of a wheel, the periphery of which rides against the edge 73 or border portion 74 of the memory to be coated. The marks 78 may also be applied in the form of a code by the controlled pulsing of a solenoid which projects a printing cut or wheel against the record member and away from such lower edge or border 73 or by the selective operation of a valve disposed in the inlet of a small spray nozzle operative to spray apply printing ink or magnetic recording material to selected areas of the members E' such as the areas defined by marks 78. The recording transducer may also include (c) a variable mask which is operated by bi-stable solenoids connected directly to the outputs 27 of the pushbutton panel 26 which mask may receive mark printing material from a spray head or roller coating means applied thereagainst to provide the necessary coded array or marks; (d) a modulated intense radiation beam generating means such as an electron gun or laser generating an intense beam employed to either burn select portions of the border or margin 74 of the envelope or select portions of a recording material such as 76 so disposed to provide the necessary scannable code recording. The latter described beam recording means may be controlled, for example, by the series code signal generated by shift register 28 of FIG. 1 to provide a series code which is optically scannable.

The coding and sorting apparatus hereinabove described and illustrated in the accompanying drawings may be modified to code and sort articles of manufacture, such as boxes or containers of rectangular configuration or a configuration having at least one straight edge, which may be predeterminately disposed as described with respect to both the code marking or recording means and the code scanning or reproduction means. In FIG. 6, is shown a container 80 of rectangular configuration having a side wall 81 preferably, although not necessarily, containing an address label 75'. The container 80 may comprise, for example, a boxed mail piece, product container or pallet. Means, such as illustrated in application Ser. No. 468,418, now abandoned but a continuation of which (Ser. No. 785,868) is now U.S. Pat. No. 3,497,088, may be provided for conveying the container 80 with its lower surface 83 disposed against a flight conveyor and the side wall 81 extending a predetermined vertical plane so that the edge defined by the intersection of walls 81 and 83 will travel a predetermined lineal path. By such means, all containers having rectangular parallelepiped configurations, regardless of the height, width and depth of said containers, may be so conveyed that the lower edge of each container may travel the same line path, thus predeterminately positioning the lower borders of each container with respect to a stationary coating or marking means. Such coating or marking means may comprise any of the described magnetic recording, printing, spray applying or modulated beam burning means. In FIG. 6 is shown a wheel 88 which is rotationally supported at the side of the belt conveyor 87 carrying the container 80 and positioned such that the periphery of such wheel rides against a band-like portion 85 of the side wall 81 of the container adjacent the lower edge 84 thereof. Radially movable within the wheel 88 are a plurality of printing cuts or mark applicating devices 69, each of which is operated by a separate bi-stable solenoid disposed within the wheel. Each of such solenoids is operatively connected to a respective of the outputs 27 of the bank of code switches 26S of FIG. 1, so that the printing cuts may be selectively projected and retracted to apply marks in a coded array along the recording area 86 of the border 85 as the wheel 86 is rotated and either moves longitudinally along the wall of the container or rotates as the container is conveyed therepast.

Located downstream of the code applying wheel 88 is provided a magnetic or optical scanning transducer supported closely adjacent the conveyor 87 and operable to scan a series or parallel code applied to the border 85 adjacent edge 84 of the container 80. The output of such transducer may be connected to means for transferring the container 80 to a selected of a plurality of branch conveyors, such as the means provided in FIG. 1 for routing envelopes or cards. The code wheel 88 of FIG. 6 may be replaced by a code modulated radiation beam generating means of the type described which is operative to discolor or burn portions of the container wall or a recording material 86 disposed adjacent the edge 83 of the container.

Further details of the code applying wheel 88 of FIG. 6 are illustrated in FIG. 7. The printing wheel 88 comprises a disc-shaped hollow housing having upper and lower disc-shaped walls 96 and 97 separated by a spacer ring 98 having a plurality of holes 98H extending radially therethrough. The printing devices 89 comprise a plurality of bi-stable solenoids 90 which are mounted on the bottom plate 97 inwardly of the ring 98 and have their shafts 91 extending radially to holes 98H. Secured to each shaft 91 of each solenoid 90 is a retainer 92 for a printing cut 93, which printing material may be retracted so that its outermost surface is below the peripheral surface 88' of the wheel 88 when the solenoid 90 is retracted in one of its two bi-stable states. When the solenoid is pulsed or switched to its other bi-stable state, the printing cut 93 protrudes outwardly from the peripheral surface 88' of the wheel 88 and provides means for applying a code mark to a surface against which the peripheral surface 88' of the wheel is rolled. Each of the solenoids 90 has an input wire pair 94 extending radially inwardly and along the interior of a hollow shaft 95 on which the wheel is mounted, said shaft extending to a drive means such as a rotary solenoid or motor which power rotates such wheel against a surface, such as any of the band areas 76, 78 or 86 of an envelope, card or container such as shown in FIGS. 4, 5 and 6. The wires 94 may extend to an array of commutator and brush elements located on the shaft 95 or directly to respective code signal generating output means such as the outputs 27 of the binary code generating pushbutton switches 26S of the bank 26 illustrated in FIG. 1. The solenoid energizing lines 94 may be connected to a computer or the circuits of the hereinabove described means for automatically reading the alpha-numeric address 75 on the envelope or card or other means identifying the article being coded. If the rotary solenoid is provided and coupled to shaft 95 so as to rotate he wheel 88, it may be activated, for example, by the signal generated on the output of delay relay 31 or a means such as the photoelectric scanner 22 which is operative for detecting the leading edge of the card assuming that the conveyor along which the card is driven is operated thereafter for a sufficient time interval to permit the wheel 88 to effect a cycle of operation against the member being coded. In an alternate form of the invention, the wheel 88 may be translated and rotated relative to the envelope, card or container while the latter is held stationary during a coding cycle.

The printing material 93 located at the end of the solenoid shaft may comprise a self-inking printing out or other suitable material which either contains it own ink supply or is fed a supply of ink from a source located within the retainer 92, shaft 91 or the housing of the solenoid 90. A suitable material which contains sufficient ink to provide thousands of printed impressions is a micro-porous plastic containing ink or magnetic recording material in the cells thereof. U.S. Pat. No. 2,777,824 describes a flexible plastic material may be formulated to encapsulate a variety of liquids such as inks which may be disposed upon compression of the material against the surface and such material may be utilized for the printing material 93 of FIG. 7.

It is noted that any suitable fast-drying printing ink or magnetic recording ink or magnetic recording ink may be dispensed from the periphery of the wheel 88 along the edge or border area of a card, mail piece, or container as described herein and illustrated in FIGS. 4 to 6. The solenoid 90 may also be of the mono-stable type whereby electrical energy applied to selected of said solenoids will be operative to project the printing devices of each solenoid outwardly from the peripheral surface 88' of this wheel a suitable degree to permit spot marks to be applied to a flat mail piece or container in a coded array as described depending on which of those solenoids are energized.

The arrangement illustrated in FIG. 7 may also be operative to magnetically record a code on a strip of magnetic recording material such as 76 of FIG. 4 by replacing the printing material 93 with a respective permanent or electromagnet, when the shaft 91 of the solenoid is projected, projects the magnet so that it will orient or disorient the magnetic domains of the magnetic recording material as the peripheral surface 88' of the wheel is rolled thereagainst or will not affect same when retracted into the openings 98H.

Further improvements to the described and illustrated apparatus may include the following. The free-wheeling wheels 57 and 57' of FIG. 2 may be replaced by a plurality of opposed jets of air operative to support the mail piece E in a substantially vertical attitude as it is driven along the wheels 54 or to drive or assist in the driving of said mail piece therealong.

The wheels 57 and 57' of FIG. 2 may also be replaced by a plurality of endless, power-operated belts which are mounted on pivotted and spring-loaded arms equivalent to the cantilevered spring members 55 and 55' of FIG. 2 for driving the mail piece E therebetween.

In FIG. 3 if the mail pieces E are fed vertically in horizontal attitudes in the bin 61 as illustrated in FIG. 3, they may be upended to attain the vertical position illustrated in FIG. 2 after they are fed onto the conveyor 68 by suitably designing conveyor 15' to receive the single mail pieces from 68 and eventually guide same to a vertical attitude. This may be effected by providing suitable pulleys and guides for the belts 69 and 70 to direct said belts from a substantially horizontal attitude at the end of the conveyor which receives pieces from conveyor 68 to a substantially vertical attitude at or near the end thereof so that the envelopes or cards may be fed therefrom vertically along conveyor 19 to preposition their lower edges and permit coding and reading as described. Accordingly, conveyor 15' may be used to upend and feed envelopes and cards to an aligned array of powered conveying wheels such as 54 either with the lower edge of each piece aligned with the bottom of the wheel indentation or smallest diameter or at different heights thereabove so that gravity may be utilized to cause the pieces to drop into the center of the receiving wheels to align the lower edges of said mailpieces. Depending on the maximum thickness of pieces to be conveyed, the slopes of the sidewalls of the depression in the wheels 54 may be greater or less than that illustrated. In fact, by providing wheels 54 with very steep wall portions and sufficient difference between maximum and minimum diameters, the support means for the upper walls of the envelopes or cards may be eliminated whereby each mailpiece is supported in a vertical or near vertical attitude, as it is driven or conveyed, by the wheels per se.

Stationary intense radiation beam means such as a modulated light beam generated by a laser, an electron beam or other suitable beam generated by means fixedly mounted with respect to the described conveyors may be used for recording and/or reading codes disposed along or parallel to the lower edge of each mailpiece or carton as the piece is driven therepast. Writing or recording codes or characters along said recording area may be effected by modulating the beam intensity to (a) burn and discolor the material such as paper comprising the piece, (b) discoloring or sensitizing a material applied as a spray or roller coating thereon, (c) discoloring or sensitizing a recording material applied as a tape which has been disposed along a predetermined band of the piece as described, (d) demagnetizing by heat selected areas of a domain oriented magnetic recording material applied as a tape or coating rolled or sprayed onto the selected area of the piece, (e) burning one or more holes completely through the card, envelope or article fed past the beam generating means to permit light to pass therethru for optical reading purposes or to permit switch contact means or switch arm moving means to become activated as the piece passes the reading station, (f) burning selected areas of an opaque coating material such as a polymer disposed as a film over a reflecting material or a metal tape or film applied to the recording area of the piece to permit electro-optical or electrical reading means to read said uncovered areas by fixed transducers or scanners operative to scan said piece as it is driven therepast, (g) burning selected areas from an opaque coating in the form of a code or character area array uncovering a reflex reflecting material disposed beneath said opaque coating to permit electro-optical reading by photoelectric cell means receiving light from a light beam directed against said uncovered reflex reflecting material, (h) burning away of selected areas or the desensitizing of selected areas of luminescent material which is roller printed, spray applied or otherwise provided on the face of the piece such as on one or more postage stamps. With respect to the latter described means for recording destination codes, it is noted that postage stamps or labels may be affixed to the surface of the piece which may have luminescent or sensitized material coating the entire area thereof as a printing ink or applied along a border thereof and operative to be burned off or desensitized as a series or parallel bit code along spot areas thereof by the described intense recording radiation beam.

Figures 8, 9:
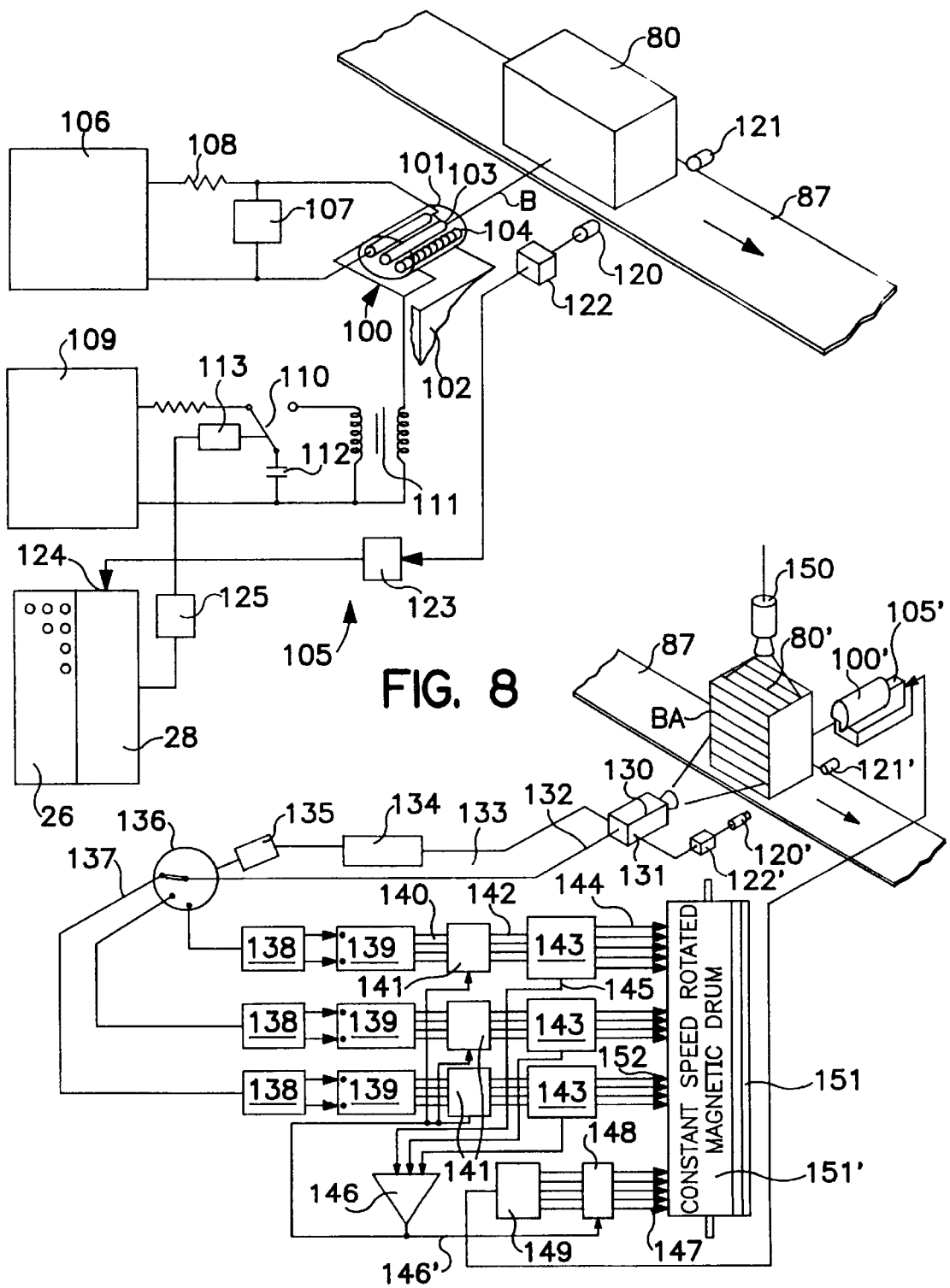
FIG. 8 is an isometric view of an object on a conveyor being coded with a pulsed radiation beam and a schematic diagram of electronic means for controlling the operation of the radiation beam generating means to apply select codes to such objects as it is conveyed past the beam generating means.
FIG. 9 is an isometric view of an object on a conveyor in motion past a scanning station which includes television camera means for scanning the object both along a plurality of scanning paths and from a plurality of directions.

There is shown in FIG. 8 one form of circuitry for controlling the recording of a code defined by beam pulses of intense radiant energy generated by a laser directed at a moving object such as a mail piece, product container or work in process disposed on a conveyor. In FIG. 8, the object is illustrated as a rectangular shaped container 80 which is adapted to move on a powered belt conveyor 87 past a laser 100 which is supported within a housing 101 disposed immediately adjacent the conveyor 87 on a mount 182 and directed to the pulsed beam B thereof to intersect all containers or work pieces at a predetermined distance above the conveyor so that if the work pieces are all properly aligned on the conveyor, each will have a code burned or otherwise provided in its surface at a predetermined distance from the edge or surface thereof disposed against the conveyor.

The laser 100 is shown as a solid medium laser containing a ruby rod 103 surrounded by a flash tube 104 which is pulsed by energy fed thereto so as to pump the laser and cause it to generate a pulsed output. Other forms of lasers may also be provided such as a so called $CO_2$ laser which may be modulated or pulsed in its operation by means similar to that illustrated in FIG. 8 or by other simple means operable in response to a series chain of control signals defining the code information to be recorded on the container or object moving along the conveyor. In other words, the circuitry illustrated in FIG. 8 is only suggestive by each light pulse of the laser operable to discolor or bore cavities in the surface of the container or work or to discolor, cavitate or otherwise effect a pulse code recording therein.

The control circuitry 105 includes a variable high voltage power supply 106 such as a half-wave power supply fed by a 110-volt, 60-cycle alternating current which converts said current to a pulsating direct current of high voltage applied to charge a bank 107 of capacitors which store electrical energy through a resistor 108. As illustrated, the flash tube 103 is connected across the terminals of the capacitor bank 107 and is applied to fire the laser for generating a pulse of intense light energy when a trigger switch 110 is closed. The trigger switch 110 is connectable in series with a trigger transformer 111 and a trigger power supply 109. When switch 110 is in its closed or energized position, voltage from power supply 109 connects the trigger capacitor 112 across the primary of the trigger transformer 111 which develops a high voltage pulse across the secondary of the transformer which is fed to the xenon flash tube 103 causing the gas thereof to become conductive and firing the flash tube which irradiates the laser rod with a brilliant flash of visible light causing the laser to emit a high energy pulse of light which is directed at the article or object 80 moving along the conveyor 87.

Depending upon the parameters of the firing circuitry and the frequency at which the switch 110 is closed, a series of pulses may be generated on the output of the laser 100 and directed at the object 80 moving along the conveyor so as to record a series pulse code on or within the surface startup thereof by burning, discoloring or sensitizing the material therealong a bank area a predetermined distance above conveyor.

The trigger switch 110 is shown as being operated by means of a monostable solenoid 113 which may be pulsed to close the switch monentarily each time it receives a control signal. The control signals fed to operate the solenoid 113 may be generated, for example, by the means illustrated in FIG. 1 (e.g. by the signals generated on the output of parallel-to-series convertor or shift register 28 as set up in a manual switching switch bank, such as a keyboard or other suitable means, such as the signals generated in selectively reading recordings from a memory.

The means of FIG. 8, which is operable to cause the shift register 28 to generate the series code signal held therein, comprises a photoelectric cell 120 scanning conveyor 87 and receiving light from a light source 121 disposed at the opposite side of the conveyor. When the object or article 80 travelling on the conveyor 87 intercepts and blocks light from light source 121, the photoelectric controller 122, which is connected to the photoelectric cell 120, generates an output signal which is passed through a delay relay 123 which is connected to the trigger or readout control input 124 of the code generating device 28. The output of code generator 28 is connected an amplifier 125 which generates pulses of sufficient intensity to energize solenoid 113 and momentarily closes switch 110 to pulse the laser 100. As stated, means other than the circuitry illustrated in FIG. 8 may be utilized for pulse-modulating a laser which is operative to scan the surface of a container, unit of work-in-process or other object moving along a conveyor for coding same as described.

While the code to be recorded on the object is initially generated in FIG. 8 by means of a keyboard 26 as described, it may also be generated from recordings in a memory such as a core memory, magnetic drum, relay storage banks or other form of memory as selectively reproduced therefrom in response to signals generated in detecting and identifying and object comprising of a plurality of different objects passing the coding station. The keyboard may also be wired to permit it to effect the selection of code recordings from a memory by manually cloning a particular switch or key closure.

For example, the rotating disc electro-optical reading and character identification means provided in my U.S. Pat. No. 3,309,669 and U.S. Pat. No. 3,555,246 may be modified to read characters on an article such as a mailpiece, generate digital signals representative of the characters read such as the town and state or zip code, present said digital signals to a computer having comparator means and thereby effect the generation of a code such as a binary digital pulse code which is applicable, for example, to rate a laser on and off a number of times as in FIG. 8 to effect the recording by the beam thereof of a series code or codes along a band area of the object as the object is conveyed past the laser.

Various other means may also be employed including electron beam scanning means such as a flying spot scanner for scanning the face of an envelope or other container of mail having an address thereon and generating code signals representative of the destination or address printed on the face thereof. These signals may be applied to a computer containing a memory of all destinations in code form and a comparator means for electronically comparing the mailpiece generated signals with the codes of the computer memory. The comparator is operable to effect the generation of a code which is then applied to operate the laser to effect the recording of marks, cavities or holes along a band area of the side wall or along an edge of the mailpiece as it is conveyed past the laser as described. The need to apply the signals generated in scanning the alpha-numeric characters representative of the address on the mailpiece to a memory may be eliminated if the scanner is operable to scans so called zip codes printed as numerical characters on the mailpieces. The digitized results (e.g. binary code signals) of scanning the zip code may be applied directly to modulate or gate the laser beam on and off as the object is conveyed therepast to provide the described code along a band of the side wall of the object.

By applying an easily readable code, such as in the form of a series of properly spaced marks, holes or other form of recording, as above described, to a predetermined band area of a mail piece, the first time the mail piece is automatically scanned, a routing system may be provided wherein equipment required for scanning and routing is greatly simplified. It is noted that he described means for digitizing the signals derived from reading an address on an envelope or mailpiece of any shape which defines a code representing the address may require a relatively complex computing operation involving complex and costly equipment to effect the digitizing and comparison and to properly position the reading means with respect to the printed address or zip code which may vary in location from mailpiece to mailpiece. Accordingly, if the proposed single scanning, identifying and coding means is applied to provide a code to the mailpiece as described, subsequently used scanning equipment may be substantially simplified as it may only comprise simple photoelectric detectors or magnetic transducers for reading the simple codes applied to predetermined areas of each mailpiece as hereinbefore described.

Modified forms of the apparatus described may be utilized to identify and code or merely identify objects on a moving conveyor, such as articles of manufacture, work-in-process, containers of products, material or work-in-process, etc. FIG. 9 shows an apparatus for identifying and coding articles on a conveyor past a scanning station containing one or more scanning devices, such as flying spot scanners 130 and 150 or modified TV cameras. Identification is effected by suitably beam scanning one or more dimensions of the object as it passes or is stopped at the scanning station and generating code signals which are representative of the dimension or dimensions scanned, then comparing such signals with signals recorded in a memory representative of all the objects expected to pass the scanning station and, when a match of the signals generated is effected, generating a code which is representative of the identification of the object. The code, so generated by the identifying means may be recorded in a memory for auditing or inventory purposes, and/or may be applied to operate routing apparatus disposed along the path of travel of the objects. Such codes may be recorded in a magnetic recorder, printer or laser recording means.

The flying spot scanner 130 of FIG. 9 is operable to scan one or more band areas BA of the side wall of the objects 80' as they pass through the scanning field, which band areas extend parallel to the conveyor 87 on which the object is travelling and are spaced apart so as the provide signals indicative of the shapes of objects passing the scanning station. Automatic deflection control circuits for the beam of the scanner 130 are operable to cause the beam thereof to scan the surface of each object a number of times, each along paths at different predetermined heights above the conveyor 87. The respective video signals generated during each scanning are digitized and the binary digital codes generated are representative of the object's dimensions scanned and are presented to comparator circuits containing signals presented thereto from a memory. When a match occurs in the comparator circuits, signals are generated which are representative of the object identified. These signals may be applied to code, route or otherwise affect the object or may be recorded.

In the arrangement illustrated in FIG. 9, a flying spot scanner 130 is triggered to initiate scanning an object by a signal generated by a photoelectric detector when light from a light source 121' directed at a photoelectric cell 120' positioned across the conveyor, is interrupted by the object to be scanned. A photoelectric control 122', then generates an output signal which is passed to the trigger input 131 of the flying spot scanner 130 and initiates a scanning cycle. The video signal output of scanner 130 is passed on a line 132 through a rotary stepping switch 136, or its electronic equivalent, to a series of digitizing and comparator circuits by causing such switch 136 to step after the beam has completed a horizontal scanning sweep sufficient to permit it to completely scan the width or length of the maximum dimension of all objects scanned. The switch 136 is stepped to pass video signals to respective comparator circuits so that signals representative of the side view shape of the object may be obtained. The horizontal scanning sweeps along article band areas FA may be provided every half inch, inch or selected distances apart, such that scanning signals may be generated for all objects which may be automatically analyzed to permit the discrimination of all objects in the system and the automatic identification thereof. The switch 136 may be stepped by a solenoid operated by vertical deflection signals or signals generated by the scanner after completing a horizontal scanning sweep. The complete video signal generated by such scanning is thus passed through switch 136 to a selected of a plurality of comparator circuits 143. Notation 134 refers to a time delay relay in the output 133 of the TV camera for properly delaying the operation of the solenoid for operating switch 136, if the vertical sync signal employed to control the beam to effect one horizontal sweep is also applied to operate the rotary switch to pass the video signal generated during the next sweep to the next code comparator circuit.

Each of the outputs 137 of the rotary distribution switch 136 extends to a respective chain of circuits for digitizing and comparing the code signals representative of the length of the object scanned with code recordings provided on a magnetic drum 151 which code recordings are representative of the dimensions of objects presented to the conveyor 87 for identification. The recordings are in binary digital form and are arranged on the drum 151 such that all those recordings which are representative of the dimensions of a particular object to be identified will be reproduced simultaneously by banks of magnetic pick-up heads 152 which are connected to respective comparators for signals generated by digitizing each of the video signals which are representative of the lengths of those portions of the object scanned. Each video signal generated during horizontal scanning is passed through a particular output of switch 136 to respective logic circuitry 138 of the type described in my U.S. Pat. No. 3,081,379 for processing such video signals and generating respective edge indicating pulses generated in scanning the leading edge and the end of the object. Such pulses are applied to respectively start and stop a digital clock or to gate the output of an analog-to-digital converter provided as part of a logic circuit 139, which generates codes on a plurality of outputs 140 each of which codes is representative of the length of that dimension or band area of the object scanned by the beam as it generates the video signal so digitized. The parallel code on lines 140 is passed to a relay bank 141' and held in relay storage therein to activate parallel outputs 142 thereof which extend to a code matching relay 143. The code matching relay is designed in accordance with the teaching of my U.S. Pat. No. 3,081,379 and generates a control signal on its output 145 when a code present on its inputs 142 matches the code present on its inputs 144 generated by the magnetic drum pick-ups.

When the outputs 145 of the code matching relays 143 are all simultaneously activated, a condition which indicates that all of the dimensions derived by scanning all elements of the side view of the object match or correspond to the signals recorded on the drum which represent a similarly shaped object, a signal is generated, indicating such condition, by a logical AND circuit 146 having its plural inputs connected to said code matching relay outputs. Drum recording tracks provided along an end-recording area 151' of the drum 151 contain code signals representative of the objects to be identified. These signals are so located that they may be respectively reproduced by a bank of pick-up heads 147 when their respective dimension representing codes are present at and are being reproduced by the magnetic pick-up heads 152 which are connected to the code matching relays. Normally open switches 148 in the outputs of heads 147 prevent the passage of the codes generated by such heads to a parallel-to-series converter 149. Switch 148 is closed by the signal generated by an AND circuit 146 when all code matching relays are activated so that only the code representative of the identified object is passed to converter 149, the output of which extends to control circuitry 105' for a recording laser 100', which is located, and operative in response to said code so as to effect the recording of an identifying or routing code on the object as described. The code generated on the output of parallel-to-series converter 149 or multi-pole switch 148 may also be applied to a recorder or computer for recording purposes or for generating further signals for controlling automatic operations on or with respect to the object identified.

If objects carried through the system are so shaped that they may not easily be identified by scanning one side thereof as described above, they may be automatically scanned from one or more other directions one or more times as described. Overhead scanning may be effected by means of a second TV camera or flying spot scanner such as 150, having its television signal output connected to circuitry, such as that provided for camera or scanner 130. The single drum 151 may contain signal recordings of dimensions scanned from such other directions and may rotate at a sufficiently high speed, say 10 to 100 times per second, to permit the rapid identification of all objects even if they are moving quite rapidly on the conveyor past the scanning station.

Individual photoelectric scanning cells may also be utilized to effect automatic scanning, one for each level to be scanned, and each having its output connected to suitable digitizing and code matching circuitry of the type described, wherein movement of the objects along the conveyor is constant and provides means for generating variations in the scanning signals when the leading and trailing edges of the objects scanned pass the photoelectric cells. Such photoelectric detection signals may he applied to generate binary code signals indicative of the lengths of the various portions of the objects scanned and applied to effect code matching, as described, for identifying such objects. The code or codes generated by heads 147 may define commands for controlling pre-programmed operations on the object or work so identified when such codes are either fed directly to a machine or machines to be controlled thereby or after they are recorded on the object and the recordings are read by a transducer located at one or more machines.

A system of the type defined in FIG. 9 may be modified to permit the automatic identification and/or coding of two or more objects of the same shape which differ in certain internal characteristics, weight or contents. For example, a weight sensing transducer may be disposed at the scanning station and operative to generate a signal which is indicative of the weight or contents of the object being scanned. Such signal may be digitized and applied to a comparator along with the signals generated by scanning one or more walls of the object as described. When a match of all signals occurs, the object is identified and the resulting code signal, generated as described is applied to code, route, or perform computations relative to the object.

In yet another form of the system of FIG. 9, product containers of similar shape may be differentiated as the contents and identified by automatically scanning and digitizing the results of scanning a label or printed illustration provided on a wall of the object. Selective area scanning means as provided in U.S. Pat. No. 3,081,379 and application Ser. No. 254,710 may be utilized to scan and generate digital signals of indicia on a selected portion of a wall of an object wherein such signals are applied, as in FIG. 9, to suitable comparator or code matching means and compared with signals reproduced from a memory per se or in combination with signals generated in scanning certain dimensions of the object, for providing identification by matching all the codes generated with code signals reproduced from recordings derived in scanning similarly shaped or labeled objects.

The same scanner or TV camera used to scan the dimensions of the wall of the object containing the indicia or label, may also be programmed and operated to scan labels or indicia to generate signals therefrom which may be compared, as described, with signals reproduced from recordings. It is also noted that a single flying spot scanner or TV camera may be employed to properly scan an object from a plurality of directions by the provision of suitable mirrors and other optical components disposed at the side of and above the conveyor at the scanning station.

In the hereinbefore described embodiments employing beam scanning of objects on a conveyor, it is assumed that suitable means are provided upstream of the scanning station for properly aligning all objects on the conveyor so that they may be properly scanned.

Modification to the apparatus described which fall within the scope of the instant invention are noted as follows:

1. The apparatus described including the multiple television camera scanning system shown in FIG. 9 may be employed to scan and identify as well as the inspect and determine the dimensions of a plurality of differently shaped objects fed by conveyor or other means to or past the television cameras 130 and 150 to permit either or both of said cameras to scan along a plurality of paths intersecting and defined by a complete dimension of each object such as the length or width of the object, combination of length and width or length, width and height in a manner to define such dimensions as respective codes as described. Electronic comparison of two or more of such codes with codes recorded in a memory may be employed to identify each other scanned for routing, record keeping and coding purposes as described.

2. The coded electrical signals generated when the video signal output of each scanning television camera is computer processed and analyzed, after being compared with signals recorded in memory, may be used to generate and print or otherwise apply codes and/or alphanumeric characters to the objects scanned for use by similar automatic scanning systems further along the line for identifying and routing the objects or containers so identified and recorded on.

3. Television camera scanning may be effected at the scanning location or station while the object is in motion as it is conveyed past the scanning station or while it is stationary thereat by stopping the conveyor. If the conveyor is speed controlled, the scanning signals generated when the television camera or cameras scan the same or similarly shaped objects will be similar or repetitive provided that the objects are similarly aligned with respect to the camera or cameras. Such aligning may be effected by aligning all objects similarly when placed on the conveyor or at the scanning location by means of suitable alignment means which is stationary or moveable thereat, such as by means of an article manipulator programmed to effect such alignment. The TV camera or cameras may also be manipulated as provided, for example, in such my U.S. Pat. No. 4,511,918 and thereto which describe automatic manipulation apparatus for television cameras and the like employed to effect video scanning for automatic inspection purposes.

4. The scanning apparatus illustrated in FIG. 9 may be employed to automatically measure a plurality of dimensions of an object while the object is stationary at the scanning station and/or while it is in motion past the television camera or cameras. The two video cameras 130 and 150 may each simultaneously scan a respective side or wall of each object and generate video signals, which, when automatically analyzed, define information relating to (a) the location of different portions of either or both edges of each side or wall portion of a solid object such as a component, product or container, (b) the width and/or length of an object or dimensions of select portions thereof, defined, for example, by the illustrated and described parallel beam scannings across the face or adjacent faces of the object, (c) surface characteristics of select portions of adjacent and/or opposite walls of an object as determined by computer processing and analyzing video picture or vision signals generated by sequentially or simultaneously scanning said faces or walls of the object while in motion on the conveyor or stationary at the scanning location or station, (d) internal structural and material characteristics of the object detected by penetrating radiation such as X-rays, magnetic resonance or the like effected by respective radiation generators whose radiation is passed to the two television cameras or to an image conversion screen or screens scanned by the television cameras.

5. The apparatus of FIG. 9 may be employed to simultaneously or sequentially scan a code such as a bar code disposed on a wall of an object and one or more surface portions of the object to both identify, measure or inspect and record and display the information so determined for quality control and/or record keeping purposes. In such a system, beam recording device 100' may be operable to record a code along a select portion of the surface of the object which code both identifies the object and/or defines information relating to its quality and/or dimension(s).

I claim:

1. A method for automatically inspecting, coding and sorting objects comprising:
   (a) scanning an object a first time with a first scanning device and generating first scanning signals defining a select characteristic of the object;
   (b) computer processing and analyzing the first scanning signals and generating first coded electrical signals defining the select characteristic of the object;
   (c) using the first coded electrical signals to effect the application of a scannable code on the object, which code is indicative of the select characteristic;
   (d) scanning the code applied to the object with a second scanning device and generating second scanning signals defining the select characteristic of the object;
   (e) computer processing and analyzing the second scanning signals and generating second coded electrical signals; and
   (f) applying said second coded electrical signals to sort the object.

2. A method in accordance with claim 1 further comprising using said first coded electrical signals to identify said object.

3. A method in accordance with claim 1 wherein scanning the object the first time includes scanning a plurality of different portions of said object.

4. A method in accordance with claim 1 further comprising scanning said object from a plurality of different locations.

5. A method in accordance with claim 1 wherein scanning said code is effected by directing a radiation beam along a plurality of scanning paths across the face of said object.

6. A method in accordance with claim 5 further comprising directing said scanning radiation beam along a plurality of parallel scanning paths across the face of said object.

7. A method in accordance with claim 1 wherein scanning with the first and second scanning devices includes controlling a plurality of scanning devices, each of which scans said object from a different location along a conveying system.

8. A method in accordance with claim 1 wherein scanning with the first scanning devices includes controlling a plurality of radiation scanning beams, each of which scans a plurality of select paths across respective surface portion of said object.

9. A method in accordance with claim 8 further comprising controlling each of said radiation beams to scan said object from a different direction as said object moves past said radiation beams.

10. A method for automatically identifying objects comprising:
    (a) conveying and aligning an object to be scanned at a scanning station having a radiation beam scanning device,
    (b) controlling said scanning device when said object is at said scanning location to cause said radiation beam to scan a plurality of scanning paths across a surface of said object,
    (c) sensing reflections of said radiation beam and generating respective scanning signals as said radiation beam scans a select portion of said object,
    (d) processing and analyzing said scanning signals and generating first coded electrical signals defining said scanning signals,
    (e) comparing said first coded electrical signals with signals recorded in a memory and generating further coded electrical signals defining a select characteristic of said object, and
    (f) employing said further coded electrical signals to cause an applicator to place select indicia on said object, said indicia defining said select characteristic of said object.

11. A method in accordance with claim 10 including employing said further coded signals to effect the identification of said object.

12. A method in accordance with claim 10 further comprising recording said indicia as a scannable code which identifies said object.

13. A method in accordance with claim 10 further comprising conveying a plurality of different objects past said scanning location, scanning each of said objects with said scanning device when it is located at said scanning location, and repeating acts (c), (d), (e) and (f) each time an object is scanned to apply respective select indicia to each object.

14. A method in accordance with claim 10 wherein conveying said object to said scanning location includes conveying a container, and further comprising: (a) controlling said scanning device to cause said radiation beam to scan a plurality of paths across the object, (b) sensing reflections of said radiation beam and generating corresponding scanning signals, and (c) computer processing and analyzing said scanning signals to generate codes defining different dimensions of said container.

15. A method in accordance with claim 10 wherein the scanning operation takes place while said object is in motion.

16. A method in accordance with claim 10 further comprising controlling the scanning device to cause the scanning radiation beam to scan said object a plurality of times.

17. A method in accordance with claim 16 including electronically processing the scanning signals generated each time said beam scans said object.

18. A method for recording indicia on an object while said object is in motion past a recording means comprising:
    controllably moving an object past a scanning station having a scanning device and a beam device, said beam device being capable of generating and modulating an intense recording radiation beam directed along a select portion of said object,
    controlling said scanning device to scan and detect a select characteristic of said object moving past said scanning station,
    generating a control signal when detection of said select characteristic is made,
    applying said control signal to cause the reproduction of a select code from a memory device, said code defining the detected characteristic, and
    using said select code to control said beam device to modulate said radiation beam and cause it to record indicia defining the detected select characteristic along space-separated areas of the surface of said object.

19. A method for automatically identifying, coding and routing a plurality of objects, comprising:
    (a) providing a plurality of objects at a staging location;
    (b) transporting one of the objects from the staging location to a first inspection station;
    (c) scanning the object at the inspection station and generating first information signals defining at least one select characteristic of the scanned object;
    (d) processing said first information signals and generating at least one coded signal identifying the scanned object;

(e) employing said coded signals to control a coding device to cause it to record on at least one surface of the scanned object at least one code defining the identity of the scanned object;

(f) transporting the scanned and coded object from the coding device to a second inspection station;

(g) scanning the code recorded on at least one surface of the object and generating second information signals defining the identity of the coded object;

(h) computer processing the second information signals and generating control signals in response thereto;

(i) employing the control signals selectively route the coded object to one of several selected locations, and (j) repeating parts (b) through (i) for a plurality of the objects provided at the staging location.

20. A method in accordance with claim 19 wherein transporting the objects to the first inspection station comprises:

(a) removing each object from the staging location;

(b) conveying each object by conveyor to the inspection station; and (c) aligning each object at a predetermined location at the inspection station.

21. The method of 19 wherein scanning the code recorded on each object at the inspection station includes scanning the object a plurality of times.

22. The method of claim 19 wherein scanning the object at the inspection station includes electro-optically scanning a portion of the object containing printed alpha-numeric indicia.

23. The method of claim 22 wherein computer processing the first information signals includes employing a character recognition device to recognize the printed alpha-numeric indicia.

24. The method of claim 19 wherein the objects comprise pieces of mail having zip codes and wherein scanning each object and generating first information signals indicative of at least one selected characteristic of the object comprise:

(a) locating an area on the piece of mail containing a zip code;

(b) scanning the zip code with a scanning device; and (c) generating first information signals defining the scanned zip code.

25. The method of claim 24 wherein processing the first information signals includes computer analyzing said first information signals to determine the zip code of the piece of mail scanned and then generating coded signals corresponding thereto.

26. The method of claim 25 wherein employing the coded signals to control a device for providing scannable codes on the objects includes using the coded signals to control a device for recording bar codes on the surfaces of the pieces of mail, which bar codes defines the zip codes of the mailpieces.

27. The method of claim 25 wherein employing the coded signals to control a device for providing scannable codes on the objects includes using the coded signals to control a device for selectively magnetizing or demagnetizing a strip of magnetic material on the surface of the piece of mail to create thereon a magnetic code identifying the zip code of the mailpiece.

28. A method for identifying and recording indicia on an object comprising:

(a) conveying an object past an automatic scanner, (b) operatively aligning said conveyed object with said scanner, (c) scanning a select portion of the aligned object with said scanner and generating first information signals, (d) computer processing and analyzing said first information signals and generating first code signals therefrom, (e) identifying said scanned object by comparing said first code signals with coded information recorded in memory, (f) generating second code signals defining the identity of the object, and (g) using said second code signals to apply select indicia on said object, which indicia define the identity of the object.

29. A method in accordance with claim 28 wherein part (g) includes controlling the operation of a recording head to record said select indicia on the surface of said object.

30. A method in accordance with claim 28 further comprising recording the select indicia as a line of characters.

31. A method in accordance with claim 29 further comprising recording the select indicia in code form.

32. A method in accordance with claim 28 wherein part (g) comprises directing a beam of radiation at said object and controlling the beam to apply the indicia as a group of space separated marks.

33. A method in accordance with claim 28 further comprising:

(a) scanning and reading said indicia and generating further information signals;

(b) computer processing and analyzing said further information signals to generate further coded signals; and (c) applying said further coded signals to categorize said object.

34. The method of claim 33 further comprising applying said further coded signals to control the routing of said object.

35. The method of claim 29 further comprising controlling the recording head to generate and apply a line of indicia to a select portion of the surface of said object, which indicia define the identity of the object.

36. The method of claim 35 further comprising controlling the recording head to apply said indicia in the form of a plurality of spaced-apart marks extending substantially parallel to each other along a band-like area of the surface of said object.

37. The method of claim 1 wherein said object is a mailpiece, and wherein scanning said mailpiece the first time includes scanning at least part of the mailing address of said mailpiece.

38. The method of claim 37 wherein generating said first scanning signals includes generating signals defining the postal zip code to which said mailpiece is to be delivered.

39. The method of claim 38 further comprising applying said scannable code to said mailpiece in the form of a bar code representative of the indicated postal zip code of said mailpiece.

40. The method of claim 39 further comprising using said second coded electrical signals to sort the mailpiece.

41. The method of claim 39 further comprising displaying on a monitor an image of a mailpiece so that an operator may visually monitor said image and identify the postal zip code of said mailpiece, and thereafter manually controlling application device to apply a scannable code on the object.

42. A method for identifying and coding a plurality of objects comprising:

(a) recording a plurality of first codes in a memory of a computer, wherein each first code relates to a different one of a plurality of objects to be identified, (b) moving one of the different objects into scanning relation with respect to an automatic scanning device, (c) controlling the automatic scanning device to scan a select characteristic of the object and to generate scanning signals defining the select characteristic, (d) computer processing the scanning signals and generating second code signals, (e) identifying the object by comparing the second code signals with the plurality of first code signals recorded in said memory, (f) generating identifying code signals indicative of the identity of the scanned object, and (g) employing the identifying code signals to effect the marking of a surface of the object with identifying indicia.

43. A method in accordance with claim 42 further comprising controlling an automatic conveyor to present the marked object to a second scanning station.

44. A method in accordance with claim 43 further comprising scanning said identifying indicia on the marked object to identify and selectively route the object.

45. A method in accordance with claim 42 wherein the select physical characteristic scanned is a dimension of the object.

46. A method in accordance with claim 42 wherein scanning includes detecting a plurality of select dimensions of the object and wherein generating the identifying signals indicative of the identity of the object includes repeating (d), (e) and (f) with respect to scanning signals generated in scanning the select dimension of the object.

47. A method in accordance with claim 42 further comprising recording in the memory of the computer the identifying code signals relating to said object.

48. A method in accordance with claim 42 further comprising:

(a) detecting the weight of said object with a weight sensor, (b) generating weight indicating code signals, and (c) employing said weight indicating code signal to identify said object.

49. A method in accordance with claim 42 wherein the code signals recorded in the memory include a plurality of codes relating to each other, at least one code relating to at least one dimensional measurement of each scanned object, and at least another of the plurality of recorded codes relating to the weight of the object, and wherein part (c) includes scanning a select portion of the object and generating scanning signals which at least in part define a dimension of the object scanned, and wherein the method further comprises:

(a) automatically detecting the weight of the object and generating weight indicating signals, and (b) computer processing and analyzing said scanning signals and the weight indicating signals by comparing them with information recorded in the memory to generate the identifying code signals indicative of the identity of the object scanned and weighed.

50. The method of claim 28 further comprising, before performing the acts described in part (g), applying a material to a select portion of the surface of the object, and wherein part (g) comprises applying the indicia to the material at the select portion of the object.

51. The method of claim 50 wherein the material comprises a magnetic recording material, and wherein part (g) includes controlling the operation of a recording head to record the select indicia on the recording material.

52. The method of claim 50 wherein applying the material comprises applying a reflective substrate covered by an opaque coating material, and wherein part (g) comprises removing selected portion of said opaque coating material.

53. The method of claim 32 wherein applying the indicia comprises causing a laser beam to burn selected portion of a surface of the object.

* * * * *

UNITED STATES PATENT AND TRADEMARK OFFICE
CERTIFICATE OF CORRECTION

PATENT NO : 5,966,457
DATED : October 12, 1999
INVENTOR(S) : Jerome H. Lemelson

It is certified that error appears in the above-identified patent and that said Letters Patent is hereby corrected as shown below:

On the cover delete, "[*] Notice: This patent issued on a continued prosecution application filed under 37 CFR 1.53(d), and is subject to the twenty year patent term provisions of 35 U.S.C. 154(a)(2)"

Column 19, line 42, change "devices" to — device —

Column 24, line 2, change "signal" to — signals —

Column 24, line 33, change "portion" to —portions —

Column 24, line 35, change "portion" to — portions —

Signed and Sealed this

Sixth Day of June, 2000

Attest:

Q. TODD DICKINSON

Attesting Officer

Director of Patents and Trademarks